Aug. 9, 1966  E. J. H. FIALA  3,264,784
SYSTEM FOR LOCKING AND ACTUATORS PROVIDED IN A MOTOR VEHICLE
Original Filed Dec. 2, 1960  2 Sheets-Sheet 2
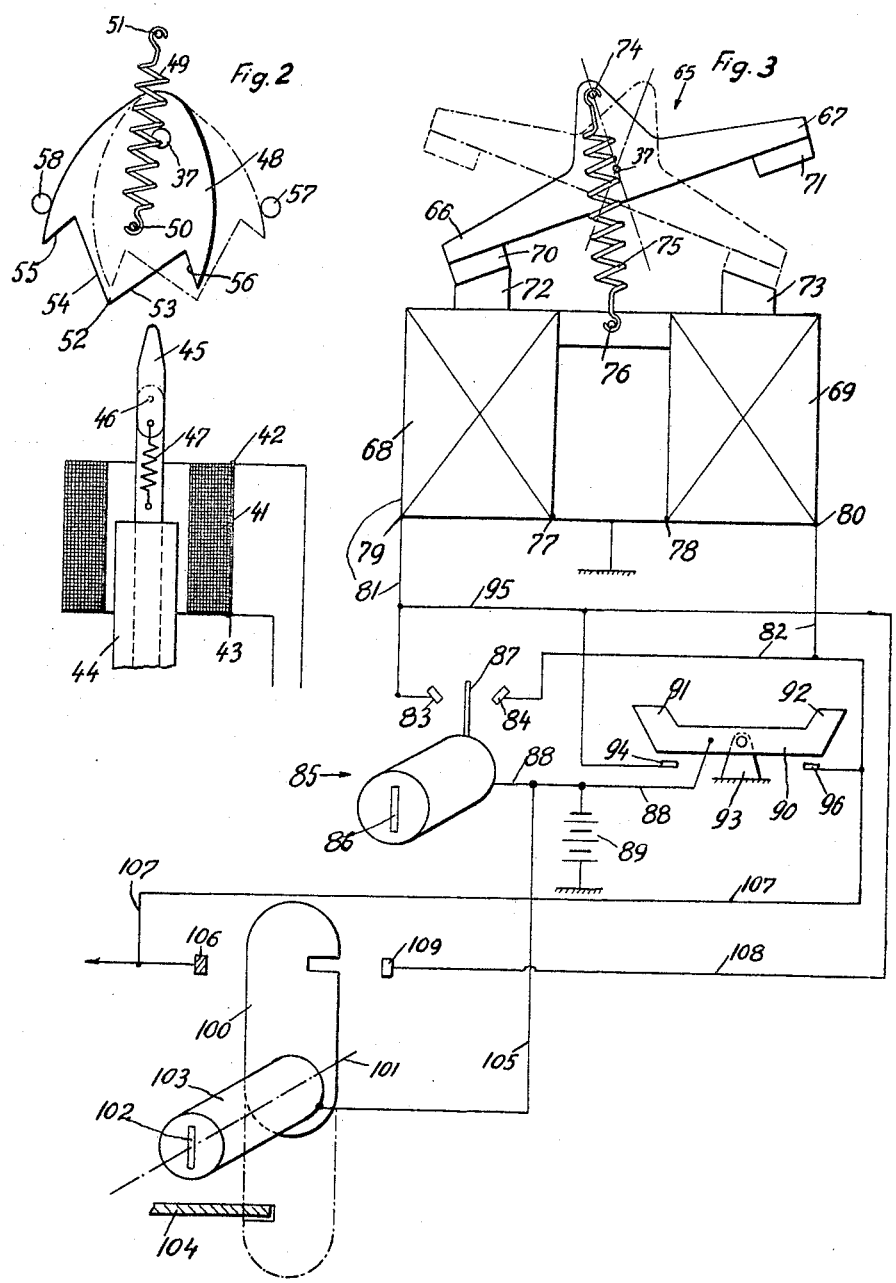
Inventor
ERNST J. H. FIALA
BY *Dicke, Craig & Freudenberg*
ATTORNEYS United States Patent Office  3,264,784
Patented August 9, 1966

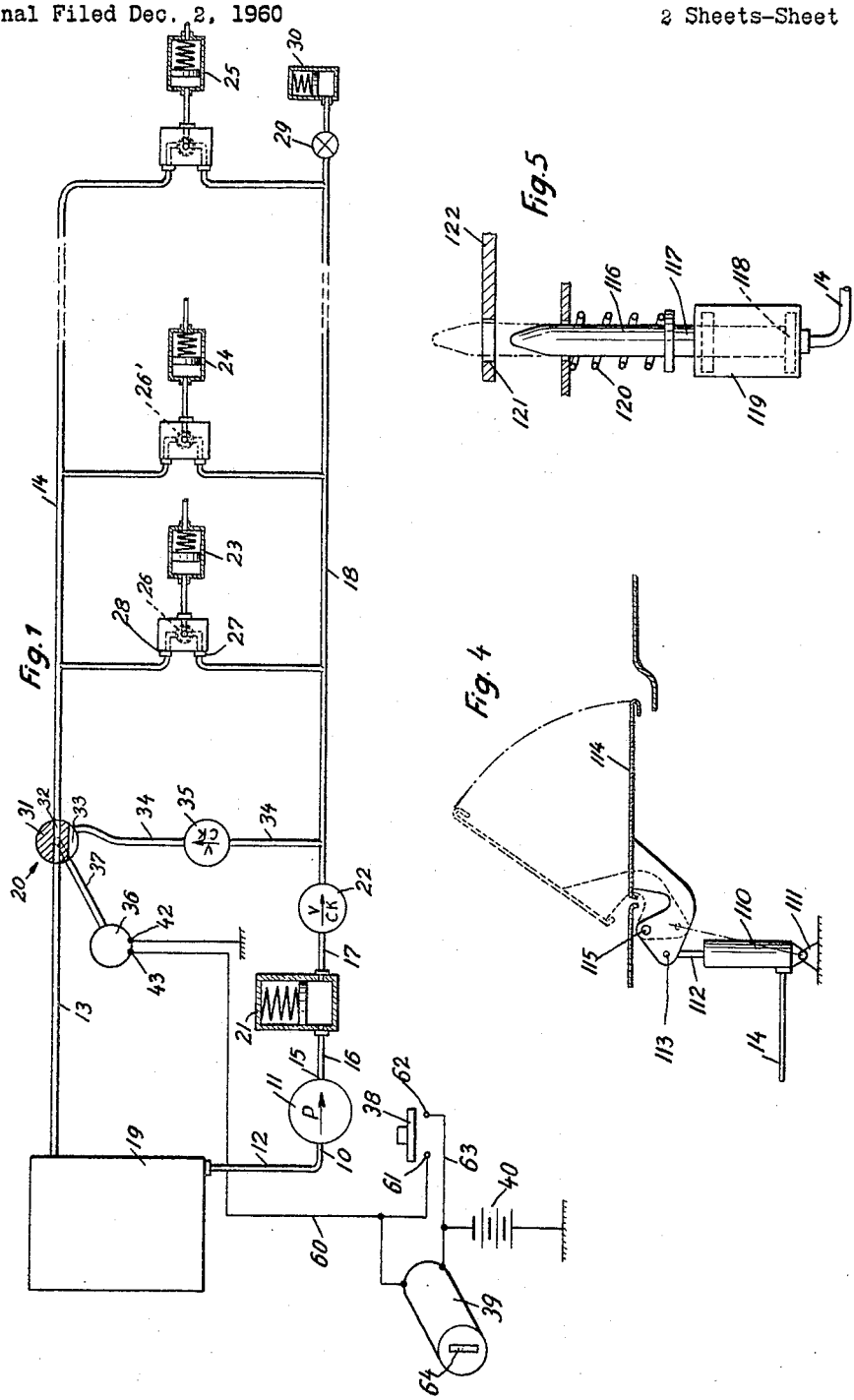

3,264,784
SYSTEM FOR LOCKING AND UNLOCKING ACTUATORS PROVIDED IN A MOTOR VEHICLE
Ernst J. H. Fiala, Berlin, Germany, assignor to Daimler-Benz Aktiengesellschaft, Stuttgart-Unterturkheim, Germany
Continuation of application Ser. No. 73,432, Dec. 2, 1960.
This application Jan. 5, 1965, Ser. No. 424,883
Claims priority, application Germany, Dec. 2, 1959,
D 32,026
20 Claims.  (Cl. 49—24)

This is a continuation of application Serial No. 73,432 filed December 2, 1960, by Ernst J. H. Fiala, and now abandoned.

My invention relates to a system for locking and unlocking a plurality of actuators provided in a motor vehicle or other vehicle, more particularly a plurality of hydraulic actuators serving to open or close windows or to operate door latches or any other desired devices. It is the object of my invention to provide an improved system of this type in which the same hydraulic circuit permits both to alternatively operate said actuators or to lock same for the purpose of locking the actuated parts of the vehicle. Further objects are to provide means for locking and unlocking a plurality of actuators under control by a single valve means; to provide conveniently located electrical switches for selectively moving said valve means into its locking position or into its unlocking position; and to provide hydraulic devices which are connected with movable parts of the motor vehicle, such as the lid of the baggage compartment or a lid masking the filling pipe of a gasoline tank, and serve to lock such parts under control by said valve means.

Further objects of my invention will appear from a detailed description of several embodiments of my invention with reference to the accompanying drawings following hereinafter. It is to be understood, however, that my invention is in no way limited or restricted to such details but is capable of numerous modifications within the scope of the appended claims and that the terms and phrases used in such detailed description have been chosen for the purpose of explaining my invention rather than that of restricting or limiting same.

In the accompanying drawings:

FIGURE 1 is a hydraulic and electric circuit diagram of my novel system, electromagnetic means for shifting the valve means being illustrated in a diagrammatic fashion only, FIGURE 2 shows a preferred form of such electromagnetic means in detail, FIGURE 3 illustrates a modification of the electromagnetic means for shifting the valve means, FIGURE 4 illustrates a device for locking a lid masking the filling pipe of a gasoline tank, and FIGURE 5 illustrates a device for actuating and locking a latch.

As shown in FIGURE 1, the inlet 10 of a pump 11 is connected with a suction pipe composed of sections 12, 13 and 14, whereas the outlet 15 of the pump 11 is connected with a pressure pipe composed of sections 16, 17 and 18. An oil reservoir 19 is inserted between the sections 12 and 13 of the suction pipe and valve means 20 to be described later in detail are inserted between the sections 13 and 14 of the suction pipe. A pressure accumulator 21 is inserted between the sections 16 and 17 of the pressure pipe and a check valve 22 is inserted between the sections 17 and 18 of the pressure pipe. The system further includes a plurality of fluid-operable actuators diagrammatically indicated as rams 23, 24 and 25. It is to be understood, however, that these actuators may be formed by any fluid-operable power-producing devices, such as rotary fluid motors or the like. These actuators may serve various purposes in the motor vehicle, for instance the purpose of closing or opening a window, closing or opening a door latch, folding or unfolding a foldable roof or the like. Each actuator 23, 24 or 25 is alternatively connectable with section 18 of the pressure pipe for actuation in one direction or with section 14 of the suction pipe for actuation in the opposite direction. For that purpose each actuator may be provided with manually settable valve means, such as a rotatable plug valve indicated at 26 for the alternative connection of the cylinder chamber of the actuator either with an inlet port 27 or with an outlet port 28, both ports being provided in the housing of the plug valve 26. The rotary plug of this valve may be provided with a handle for manual operation. Inlet port 27 is in permanent communication with the outlet pipe section 18 and outlet port 28 is in permanent communication with the suction pipe section 14.

The valve means 20 is movable to an unlocking position in which the suction pipe section 13 is in open communication with the suction pipe section 14 or to a locking position in which the suction pipe section 13 is closed, whereby discharge of pressure oil from the inlets 28 is prevented. Where an actuator such as 23, serves to close a window and moves in closing direction, when the manually operable plug valve 26 assumes the position shown connecting the actuating ram with the inlet port 27, it will not be possible to open this window, when the valve means 20 has been adjusted to its locking position because the oil that has been fed into the cylinder space of the actuator can be no longer discharged therefrom. Hence, it will appear that the valve means 20 constitutes locking means inserted in the fluid circuit 16, 17, 18, 27, 26, 28, 14, 13, 19, 12 and that the fluid of this circuit is prevented from circulating therein when the suction pipe section 13 is closed by the valve means 20.

Where an actuator, such as 24, serves to move a door latch into active or inactive position, the handle connected with the plug of the plug valve 26' may constitute the door handle or may be operable by a press button mounted adjacent to the door handle for depression causing the actuator 24 to be connected by the plug valve 26' with the suction pipe section 14, whereby the actuator 24 will be caused to withdraw the latch into inactive position permitting the door to be pulled open by the handle. Hence, the actuator when charged with the pressure fluid performs a closing motion whereas discharge of the pressure fluid from the actuator causes an opening motion. When such discharge is prevented by the valve means 20, an attempt of performing an opening motion manually, for instance an unauthorized attempt of pulling a window open, will build up pressure in the cylinder space of the actuator from which the oil cannot escape and this pressure will resist any manual effort of opening the window and will keep the same closed.

The pressure pipe section 18 may be connected by a check valve 29 with an emergency pressure accumulator 30, such check valve opening into the accumulator. Should the pump 11 be stalled for one reason or another, the pressure fluid stored in the emergency accumulator 30 may be used for one cycle of operation of the actuators, for instance for the purpose of closing the windows or unfolding the roof or closing the door latches or the like. For that purpose the check valve 29 may be of a type which can be manually operated from the outside for reverse flow. As check valves of this type are well known in the art and do not form part of the present invention, a detailed description thereof may be dispensed with.

The valve means 20 is preferably formed by a three-way valve movable between a first position (shown in FIGURE 1) establishing communication between the outlet 28 and the suction pipe section 13 and a second position which is reached by rotation of the plug 31 in anticlockwise direction through an acute angle. In the first position of the plug 31 a diametrical passageway thereof registers with and connects ports communicating with the suction pipe sections 13 and 14. In the second position, however, the passageway 32 is out of registry with such ports, whereby the port communicating with pipe section 13 is closed. Another passageway 33 of the plug, however, will then establish a communication between two valve ports one of which communicates with the suction pipe section 14, whereas the other one communicates with a pipe 34 which communicates with pressure pipe section 18 and includes a check valve 35 opening towards the plug valve 20.

From the foregoing description it will be understood that the additional valve means 20 provided in addition to the valves 26, 26', etc., are so coordinated to the pipes 13, 14 and 34 and the outlets 28 as to alternatively establish communication of each outlet 28 either with the suction pipe 13 for actuation of the actuators in the opening direction or with the pressure pipe section 18 through pipe 34. This latter alternative connection has the following effect: The check valve 35 positively prevents any discharge of pressure oil from the actuators. Therefore, any windows which have been previously closed by their hydraulic actuators cannot be opened by manual effort in an attempt of pulling the window open. A window, however, which is still open, when the plug valve 20 is moved to its second position, the valve 26 of the actuator of such window being set to connect the actuator cylinder space with the outlet 28, will be automatically closed, when the valve 20 is turned to its second alternative position, since this has the effect of admitting pressure oil to the actuator of the window via the elements 15, 16, 17, 33, 34, 14, 28, 26. The window so closed will then be locked because the check valve 35 prevents return flow of the pressure oil.

The three-way valve is preferably movable by and connected with power-operable means which are controlled by manually operable controlling means. In the embodiment illustrated in FIGURE 1, such power-operable means are diagrammatically illustrated in FIGURE 1 as electromagnetic means 36 which has a movable element connected with the rotatable plug of the plug valve 20 by a shaft 37 and in its turn is controlled by manually operable switches 38 and 39 for selectively connecting a source of current 40 to the electromagnetic means 36.

A preferred form of the electromagnetic means 36 is shown in FIGURE 2. It comprises a solenoid having a coil 41 provided with terminals 42 and 43 and a reciprocatory core member formed by a plunger 44 and a tongue 45 pivotally connected to the end thereof at 46. A spring 47 so connects the tongue 45 with the plunger 44 as to resiliently keep the same in aligned relationship. Moreover, the electromagnetic means comprises a pivotal element 48 fixed to the shaft 37 for common movement with the plug of the three-way valve into one or the other of two positions, one position being shown in full lines and the other one in broken lines. A snap spring 49 connects a pin 50 fixed to the pivotal element 48 with a stationary pin 51 in such a way as to keep the pivotal element biased into one or the other of said positions. The pivotal element is provided with a tooth 52 having side faces 53 and 54 disposed angularly with respect to each other. Moreover, the pivotal element 48 is provided with abutments 55 and 56 at the roots of the tooth sides 53 and 54. Stationary pins 57 and 58 constitute limit stops limiting the angular movement of the pivotal member 48 substantially to the angular spacing of the valve ports communicating with the pipes 14 and 34.

The operation is as follows: In response to the first energization of the solenoid coil 41 the core member will be driven towards the pivotal element 48 by the electromagnetic forces and the tongue 45 will engage the tooth side 53 and will be guided thereby into engagement with the abutment 56, thus exerting an anticlockwise torque upon the pivotal element causing the tooth 52 to swing towards the right with reference to FIGURE 2 through the central position, thus tensioning the snap spring 49 which upon passage of the tooth 52 through the position of alignment with the core member of the solenoid will swing the pivotal member into the right-hand position shown by broken lines in which the pivotal member engages the limit stop 57. This rotary motion of the pivotal element 48 is transmitted by shaft 37 to the plug of valve 20 moving it to the locking position in which the valve 20 establishes communication between pipe section 14 and pipe 34 and closes suction pipe section 13. This places the system into the condition in which the actuators 23, 24, 25, etc., are locked so as to be unable to move towards the left with reference to FIGURE 1 irrespective of the setting of the valves 26, 26', etc., but may be caused to move towards the right by appropriate manipulation of the valves 26, 26', etc.

The snap spring 49 will maintain the valve 20 in the locking position just described after the solenoid coil 41 will have been de-energized.

When the solenoid coil 41 is energized again actuating its core member towards the pivotal member 48, the tooth side 54 will now be disposed in the path of the tongue 45 and will guide the latter into engagement with the abutment 55 which now is in the position shown in broken lines in FIGURE 2. As a result, the solenoid member will exert a torque in clockwise direction on the pivotal member 48 causing the tooth 52 to move towards the left from the position shown by broken lines through the central position, whereupon the snap spring 49 will complete the clockwise pivotal motion until the pivotal member 48 engages the limit stop 58. This pivotal movement will bring the plug valve to its unlocking position illustrated in FIGURE 1 in which the passageway 32 of the rotatable plug connects the sections 13 and 14 of the suction pipe and closes the pipe 34.

From the foregoing it will be appreciated that the tooth 52 and the abutments 55 and 56 and the tongue 45 form mutually engageable means on the pivotal element 48 and on the core member to move the element 48 alternately to one or the other of its alternative positions in response to successive energizations of the solenoid coil 41.

A wire 60 connects terminal 43 with a contact 61 of the switch 38 whose other contact 62 is connected by a wire 63 to the negative terminal of a battery constituting the source of current 40. The positive terminal of this battery and the terminal 42 are grounded. The switch 38 is preferably a press button switch mounted on the dashboard of the vehicle, thus permitting the driver to readily move the valve to its locking position or its unlocking position.

The second switch 39 disposed in shunt to the switch 38 may be included in a safety lock so as to be operable by a safety key to be introduced into a slot 64. This switch 39 is preferably accessible from the outside of the motor vehicle. It may be combined with a lock disposed in a door handle of a door equipped with a latch operable by actuator 25, for instance. Hence a person desirous of opening the door from the outside may so actuate switch 39 by means of a safety key inserted in the slot 64 as to cause the actuator 25 to unlatch the door, whereupon he may pull the door open.

When a person after having alighted from the car wishes to lock the doors, he must again close the switch 39 by suitable manipulation with a safety key inserted into slot 64 to thereby move the valve 20 into its locking position. Then no discharge of pressure oil from outlets 28 will be possible and through pipe 34, check valve 35 and passageway 33 pressure will be built up in pipe section 14 which prevents operation of any of the actuators 23, 24 and 25 in the opening direction. The entire system is thus locked and the doors or windows can no longer be opened.

In FIGURE 3, I have shown a modification of the electromagnetic means and the switches cooperating therewith. A rocking member 65 is fixed to the shaft 37 of the plug and has a pair of arms 66 and 67. Each of a pair of electromagnets 68 and 69 is coordinated to one of the arms 66, 67 for attracting the latter to thereby rock the rocking member 65 and the three-way valve plug selectively into one or the other of its alternative positions. Preferably, armatures 70, 71 are fixed to the arms 66 and 67 for cooperating with the cores 72 and 73 of the electromagnets 68 and 69. A pin 74 projecting from the rocking member 65 is connected by a snap spring 75 to a stationary pin 76 and tends to bias the rocking member 65 in its position shown in full lines or in its position shown in broken lines.

One terminal 77 of electromagnet 68 and one terminal 78 of electromagnet 69 are grounded, whereas the second terminal 79 of electromagnet 68 and the second terminal 80 of electromagnet 69 are individually connected by wires 81 and 82 respectively to contacts 83 and 84 of a switch 85 which is operable by a safety key to be inserted in slot 86 and has a switch arm 87 which may be optionally turned by the key into engagement either with contact 83 or with contact 84. The switch arm 87 is connected by a wire 88 to the negative terminal of a battery 89 whose positive terminal is grounded. Hence, the operator may energize either magnet 68 or magnet 69, as he desires, by turning the safety key introduced through slot 86 in one direction or in the opposite direction.

In this modification the switch disposed inside of the vehicle is provided with a rocking member 90 rockable in one or the other direction by pressure on finger tips 91 and 92. The rocking member is connected to line 88 and normally held by a suitable spring not shown in its horizontal position. The bracket 93 carrying it consists of insulating material. A contact 94 connected by wire 95 to wire 81 and a contact 96 connected to wire 82 are disposed below the rocking member for alternative engagement therewith. By pressing on the finger tip 91 or on the finger tip 92 the driver may move the valve 20 to its locking position or to its unlocking position, as desired.

If desired, shaft 37 may be provided with a knob to permit manual shifting of the valve means 20.

It may be desirable to exempt certain latches from the common unlocking operation. This applies particularly to a latch closing the baggage compartment, as it may be desirable to keep this latch locked in its closed position, whereas the actuators of the windows and of the doorlocks shall be maintained in unlocked condition, for instance for the purpose of parking the car in the garage of a hotel. For this purpose my novel system may be supplemented by the mechanism shown at the bottom of FIGURE 3 in which a pivotal latch 100 is shown which may be rocked about an axis 101 by means of a safety key to be inserted into a slot 102 of a lock 103 to be thus swung into and out of engagement with a member 104. This member may be mounted on the body of the vehicle when the lock 103 is mounted in the lid of the baggage compartment. The pivotal latch 100 is suitably electrically insulated from the lock 103 and is connected by a flexible cable 105 with the wire 88. The latch 100 may be brought into contact with a limit stop constituting an electrical contact 106 which is connected by a lead 107 with the wire 82 or into wiping engagement with a contact 109 connected by a wire 108 with the wire 81.

The operation is as follows: When the lock 103 of the baggage compartment is turned in clockwise direction into the position indicated by broken lines, the latch member 100 will engage the stationary member 104 and will thus lock the lid of the baggage compartment. When moving from the position shown in full lines into the position shown in broken lines, the latch member 100 will wipe across the contact 109 and in so doing will establish an electrical circuit from the negative terminal of battery 89 via the elements 88, 105, 100, 109, 108, 95, 81, 68, 77, 89 via the elements 88, 105, 100, 109, 108, 95, 81, 68, 77, ground, positive terminal of the battery 89. In this circuit the electromagnet 68 will be energized and will cause valve 20 to be moved to its locking position, thus locking all of the actuators 23, 24, 25, etc., while the latch 100 remains in its locked condition. If the actuators are subsequently unlocked by another central switch, for example, switch 85, latch 100 will remain in its locked position illustrated by dot-dash lines in FIGURE 3. When the latch 100 is turned into anticlockwise direction by means of the safety key inserted in the slot 102 of the lock 103, the latch will be unlocked and will engage contact 106, thereby establishing a circuit extending from the negative terminal of battery 89 via the elements 105, 100, 106, 107, 82, 80, 69, 78, ground to the positive terminal of battery 89. As a result, magnet 69 will be energized and will rock the plug valve 20 to its unlocking position. Hence, the door latches will be unlocked coincidentally with the unlocking of the latch 100 of the baggage compartment.

If desired, the system described hereinabove may be equipped with one or more hydraulic devices composed of relatively movable elements, such as cylinder and piston, constituting a chamber of variable volume and this chamber may be permanently connected with the suction pipe section 14. Such a device is illustrated in FIGURE 4. The cylinder 110 communicating with the pipe 14 is pivotally fixed to a bracket 111 mounted on the body of the vehicle, whereas the piston movable in the cylinder 110 is connected by its piston rod 112 and a pivot pin 113 to a lid 114 which may serve the purpose of masking the filling pipe of the gasoline tank of the car. As long as the valve 20 is in its unlocking position, the attendant of a filling station may easily open the lid 114 by swinging same about a pivot pin 115. This will depress the piston rod 112 and thus displace the piston within the cylinder 110. As the liquid may readily escape therefrom into pipe 14, however, the device 110, 112 will not interfere with the opening of the lid. Nor will it interfere with a closing of the lid. When the valve 20 is in its unlocking position, however, liquid under pressure will be admitted into the lower end of cylinder 110 driving the piston rod 112 upwardly and thus forcefully closing the lid 114 and locking it in closed position. A device, such as the device 110, 112, may be also applied to the lid of a glove compartment for the purpose of locking same.

In FIGURE 5 I have illustrated the latch pin 116 fixed to the piston rod 117 of a piston 118 movable in a cylinder 119 which is connected to the pipe section 14. A helical spring 120 surrounding the latch 116 tends to move it into the unlocking position shown in full lines. Admission of fluid under pressure into the lower end of cylinder 119 causes the latch 59 to be moved to the locking position shown in broken lines in which the latch engages a hole 121 provided in a member 122. By moving valve 20 into its locking position, the latch pin 116 will be moved to and locked in its locking position, whereas movement of valve 20 into its unlocking position permits spring 120 to withdraw the latch pin 59 to its unlocked position.

From the foregoing it will be seen that this invention is one well adapted to attain all of the ends and objects hereinabove set forth, together with other advantages which are obvious and which are inherent to the system.

While the invention has been described in connection with a number of preferred embodiments thereof, it will be understood that it is capable of further modification, and this application is intended to cover any variations, uses, or adaptations of the invention following, in general, the principles of the invention and including such departures from the preset disclosure as come within known or customary practice in the art to which the invention pertains, and as fall within the scope of the invention or the limits of the appended claims.

I claim:

1. A hydraulic system for the actuation and locking of closing devices, especially in a motor vehicle, comprising a pump having a suction pipe and a pressure pipe, a plurality of fluid-operable actuators, means including conduit means and individual valve means for selectively connecting each actuator with said pressure pipe for actuation in one direction and means including said individual valve means and further conduit means for selectively connecting each actuator with said suction pipe for actuation in the opposite direction, and additional valve means inserted in said suction pipe down stream from said further conduit means, said additional valve means being movable to an unlocking position in which said suction pipe is open and to a locking position in which said suction pipe is closed by said additional valve means to thereby prevent said actuation of said actuator in said opposite direction.

2. A hydraulic system as claimed in claim 1 further comprising a pressure accumulator communicating with said pressure pipe.

3. A hydraulic system as claimed in claim 1 further comprising power-operable means connected with said valve means for movement thereof, and manually operable controlling means connected with said power-operable means to control the latter.

4. A hydraulic system as claimed in claim 1 further comprising electromagnetic means connected with said valve means for movement thereof, a source of electric current, and manually operable control switches for selectively connecting said source of current to said electromagnetic means.

5. A hydraulic system as claimed in claim 1 wherein said plurality of actuators includes at least one hydraulic device composed of relatively movable elements constituting a chamber of variable volume, one of said elements being linked to a movable part of the motor vehicle, said chamber communicating with said suction pipe, whereby said part will be locked in position, when said suction pipe is closed.

6. Mechanism for the actuation and locking of closing elements, especially in motor vehicles, comprising a central hydraulic fluid circulating system including pump means having an output pressure line and a return line, each closing element being provided with an individual control valve operatively connected between said pressure line and said return line, and a main locking valve for simultaneously locking and unlocking said closing elements and rendering their respective individual control elements ineffective, said locking valve having a first position causing a pressure rise in said return line and having a second position causing a pressure drop within said return line and additional fluid passage means between said pressure line and said return line, said locking valve in said first position having passageway means forming a portion of said additional fluid passage means.

7. A hydraulic locking system in a motor vehicle of the character described comprising a pump having a suction pipe and a pressure pipe, a plurality of fluid-operable actuators, each actuator being alternatively connectable with said pressure pipe for actuation in one direction or with said suction pipe for actuation in the opposite direction, a valve inserted in said suction pipe and movable to an unlocking position in which said suction pipe is open and to a locking position in which said suction pipe is closed to thereby prevent said actuation in said opposite direction, conduit means extending from said pressure pipe to said valve, fluid passage means in said valve adapted to connect said conduit means and said suction pipe in said locking position of said valve.

8. A hydraulic locking system as defined by claim 7, further comprising electromagnetic means for moving said valve including a movable member carried by said valve, electrically energizeable means for moving said movable member, a source of electric current, and manually operable control means for selectively connecting said source of current to said electrically energizeable means, an emergency accumulator, means for connecting said emergency accumulator to said pressure pipe, and a check valve inserted in a section of said pressure pipe that extends from said pump towards said actuators and said means, said check valve being capable of opening towards said actuators and said means.

9. A hydraulic locking system comprising a closed fluid circuit including a pump, a suction pipe and a pressure pipe, a plurality of fluid-operable actuators having individual conduit means connecting said actuators in parallel between said suction pipe and said pressure pipe, a valve operatively associated with each actuator and its respective conduit means, said valve comprising means effective to place the associated actuator into communication with said pressure pipe in one position thereof while simultaneously preventing fluid flow from said suction pipe to said actuator, said valve being further effective to place said actuator into communication with said suction pipe in another position of the valve while simultaneously preventing fluid flow from said pressure pipe to said actuator, and a locking valve within said suction pipe adjacent to said pump, said locking valve having a locked position preventing fluid flow from said actuators to said pump and having an unlocked position allowing fluid flow from said actuators to said pump.

10. A hydraulic system as defined in claim 9, further comprising additional conduit means operatively associated with said locking valve and communicating between said suction pipe and said pressure pipe in the locked position of said locking valve.

11. A hydraulic locking system as defined in claim 10, wherein said locking valve is a three-way valve, and further comprising electromagnetic means for actuating said locking valve.

12. A hydraulic system as defined in claim 11, further comprising latch means, and means to lock said latch means in a locked position, said last-mentioned means simultaneously also being effective to actuate said electromagnetic means to move said locking valve into its locked position.

13. System as claimed in claim 11, in which said electromagnetic means comprise a solenoid having a reciprocatory core member, a pivotal element connected with said three-way valve for movement into one or the other of two positions, and mutually engageable means on said element and on said core member to move said element alternately to one or the other of said positions in response to successive energizations of said solenoid.

14. A hydraulic locking system comprising a closed fluid circuit means including a pump, a suction pipe and a pressure pipe, a plurality of fluid-operable actuators having individual conduit means connecting said actuators in parallel between said suction pipe and said pressure pipe, a valve operatively associated with each actuator and its respective conduit means to place the associated actuator into communication with said pressure pipe in one position thereof and to place said actuator into communication with said suction pipe in another position of the valve, and a locking valve within said suction pipe adjacent to said pump, said locking valve having a locked position in which said locking valve prevents fluid flow from said actuators to said pump and having an unlocked position in which said locking valve facilitates fluid flow from said actuators to said pump, additional conduit means, passageway means in said locking valve, said additional conduit means and said passageway means forming fluid passage means between said suction pipe and said pressure pipe in the locked position of said locking valve.

15. A hydraulic system comprising a pump, a suction pipe and a pressure pipe, a plurality of fluid operated actuators, means alternatively connecting said actuators with said pressure pipe for actuation in one direction or with said suction pipe in the other direction, a locking valve in said suction pipe movable to an unlocking position and to a locking position, said locking valve having a passageway therethrough which in the said unlocking position of said valve, is in registry with said suction pipe and facilitates the passage of fluid through said suction pipe to said pump, said locking valve further comprising means effective in the said locking position of said valve for preventing the passage of fluid through said suction pipe to said pump, said locking valve having a further passageway therethrough, a conduit member terminating at one end in said pressure pipe and at the other end at said locking valve, said further passageway connecting said one end of said conduit member and said suction pipe in the said locking position of said valve, an energy accumulator, means for connecting said energy accumulator to said pressure pipe, and a check valve inserted in a section of said pressure pipe extending from said pump towards said actuators and said means, said check valve being capable of opening towards said actuators and said last-mentioned means.

16. Mechanism for the actuation and locking of closing elements, especially in motor vehicles, comprising a central hydraulic fluid circulating system including pump means having an output pressure line and a return line, each closing element being provided with an individual control valve operatively connected between said pressure line and a section of said return line, said section having a port, and a main locking valve in said return line for locking and unlocking said closing elements and rendering their respective individual control valves ineffective, said locking valve being adapted to assume a first position and a second position, said locking valve being provided with means preventing fluid flow in said suction line to said pump means in said first position of said locking valve, said locking valve being provided with a passageway therethrough, conduit means connected at one end with said pressure line and having an end portion, said passageway in said first position of said locking valve providing a fluid passage between said end portion of conduit means and said port of said section of said return line, said means for preventing fluid flow, said passageway and said conduit means being effective to establish a pressure in said section, said locking valve having another passageway therethrough, said another passageway being coaxial with said suction line and in said second position of said locking valve facilitating fluid flow in said suction line to said pump means.

17. A hydraulic locking system for a motor vehicle comprising a closed fluid circuit means including a pump, a suction pipe comprising two sections and a pressure pipe, a plurality of fluid-operable actuators having individual conduit means connecting said actuators in parallel between said suction pipe and said pressure pipe, a valve operatively associated with each actuator and its respective conduit means to place the associated actuator into communication with said pressure pipe in one position thereof and to place said actuator into communication with said suction pipe in another position of the valve, and a locking valve within said suction pipe intermediate said sections and adjacent to said pump, said locking valve being movable to a locking position and to an unlocking position, said valve being provided with means which in the said locking position of the valve is effective to block fluid flow in said suction pipe from said actuators to said pump, said valve comprising a passageway which in the said unlocking position of said valve, facilitates fluid flow in said suction pipe from said actuators to said pump, additional conduit means having a check valve therein, said locking valve comprising a further passageway, said additional conduit means, said check valve and said further passageway forming one-way fluid passage means between said pressure pipe and only one of said two sections of said suction pipe in the said locking position of said locking valve, said one-way fluid passage means being effective to facilitate the establishment of fluid pressure in said one section of said suction pipe.

18. A hydraulic system for a motor vehicle according to claim 17, further comprising electromagnetic means for moving said locking valve to its locked and unlocked position, means including switch means and circuit means for energizing said electromagnetic means, said switch means including a key-operated latch member, said circuit means including a pair of contacts selectively engageable by said latch member.

19. A hydraulic system for a motor vehicle according to claim 17, further comprising electromagnetic means for moving said locking valve to its locking and unlocking positions, means including circuit means for energizing said electromagnetic means including a key-operated latch member movable to a latched position, said circuit means further including a contact member engaged by said latch member in its movement to said latched position, engagement of said contact member by said latch member being effective to close a portion of said circuit means and effect energization of a portion of said electromagnetic means, said energization causing a movement of said locking valve to its said locking position.

20. A hydraulic system according to claim 18, wherein said circuit means includes a further contact member engaged by said latch member in its movement away from said latched position, engagement of said last-named contact member by said latch member being effective to close a further portion of said circuit means and thereby effect energization of a further portion of said electromagnetic means, said last-named energization causing a movement of said locking valve to its said unlocking position.

References Cited by the Examiner
UNITED STATES PATENTS

| | | |
|---|---|---|
| 719,669 | 2/1903 | Hoppe. |
| 2,216,518 | 10/1940 | Parson. |
| 2,511,501 | 6/1950 | Floraday _____ 268—125 |
| 2,621,037 | 12/1952 | Riedel _____ 268—20 |
| 2,622,400 | 12/1952 | Greer. |

HARRISON R. MOSELEY, *Primary Examiner.*

J. K. BELL, *Assistant Examiner.*